Patented Jan. 30, 1945

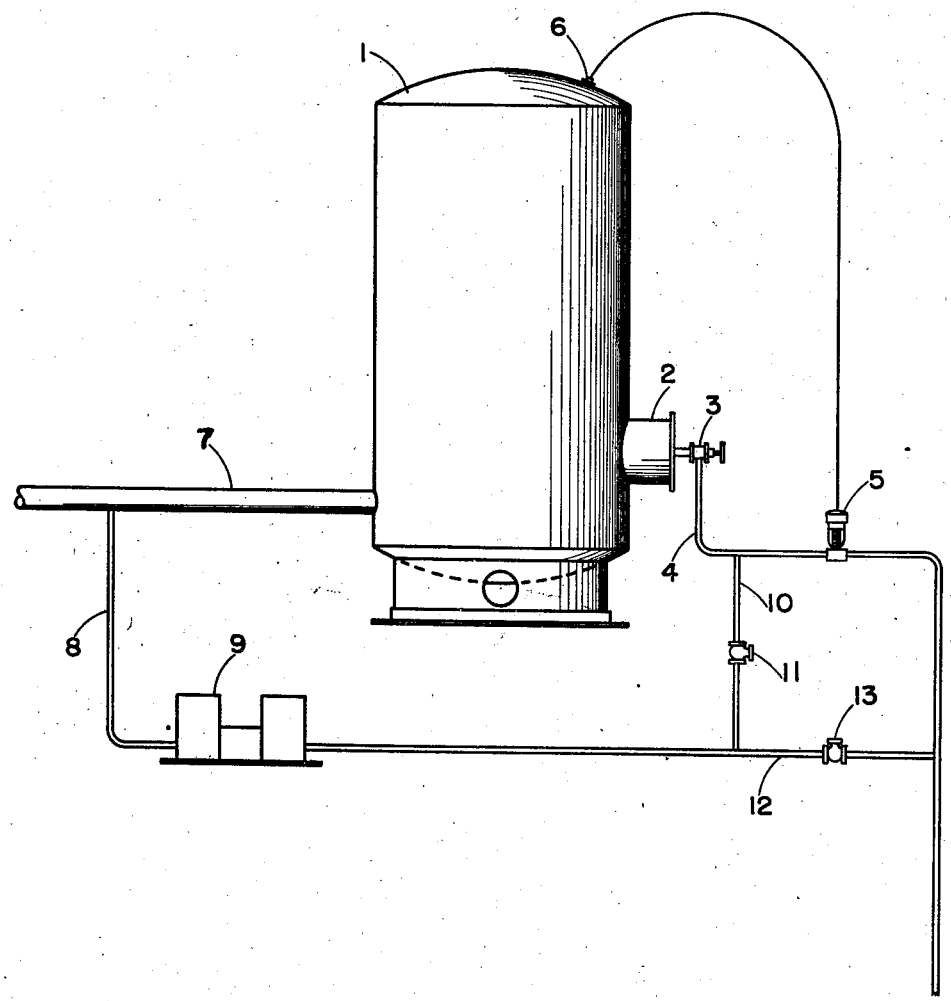

2,368,447

UNITED STATES PATENT OFFICE 2,368,447

PROPORTIONING OF EMULSION TREATING CHEMICALS

Rudolph C. Buchan, Houston, and Paul L. McGee, Conroe, Tex., assignors to Standard Oil Development Company, a corporation of Delaware Application November 5, 1943, Serial No. 509,068

1 Claim. (Cl. 252—362)

The present invention is directed to a system for chemically treating oil field emulsions and has particular reference to a method and means for automatically controlling the amount of chemical added to the emulsion in proportion to the amount of emulsion to be treated.

In practically all cases crude oil is produced in the form of an emulsion with salt water. It is customary to break this emulsion and separate its components at the surface of the well. This is done by passing the emulsion through a treater in which it is subjected to heat and the action of a chemical demulsifying agent.

It is customary to use treating tanks having heating units in which the degree of heat is thermostatically controlled to accommodate it to the rate of feed of emulsion through the unit. Such a treater is shown at page 41 of Catalogue 65, March 1941, of the National Tank Company, and at page 1755 of the 1942 edition, No. 13, of the Composite Catalogue.

It is also customary to provide in connection with such systems an automatic device for adding the chemical to the emulsion. This device usually takes the form of a gas operated pump such as that shown in Bulletin CF-4 of Black, Sivalls & Bryson, Inc., Model FU, or that shown at page 95 of Catalogue 65, March 1941, of National Tank Company, also shown at page 2301 of the 1942 edition, No. 13, of Composite Catalogue.

In such systems the difficulty has been encountered that a considerable waste of chemical is incurred since the chemical proportioning devices are of a constant feed type. In order to avoid undue waste of chemical, an attendant must be present to adjust the chemical proportioning device to accommodate it to the rate of feed of emulsion through the treater.

According to the present invention the control of the chemical proportioning device is placed on the same basis as the control of fuel to the treater so as to accommodate it automatically to the rate of feed of emulsion through the unit. This is simply accomplished by drawing the gas for the operation of the proportioning pump from the gas line which feeds the burner of the treater at a point behind the thermostatically controlled valve.

The nature of the present invention will be more readily understood from the following description of the accompanying drawing which is a side elevation in simple diagrammatic form of a treating unit modified in accordance with the present invention.

Referring to the drawing in detail, numeral 1 designates a treater having a heating unit 2, the gas feed to which is immediately controlled by a needle valve 3 and the gas feed line 4 of which is provided a valve 5 controlled by a thermostat 6. This valve may be the full-opening type, or it may be the type which has a varying open position controlled by the thermostat. The emulsion is introduced to the treater through a feed line 7 into which is injected through line 8 chemical from a gas operated proportioning pump 9.

The feature of novelty of the present invention is the provision of a line 10 connected to line 4 behind the thermostatically controlled valve 5 for conducting gas to the gas operated proportioning pump. This line is provided with a control valve 11 which will suitably be a check valve permitting the flow of gas in only one direction in line 10.

Ordinarily a single gas line is sufficient. In some instances, however, it may be desired to maintain a certain minimum feed of chemical to the emulsion line and for this purpose an additional line 12 is connected between gas line 4 ahead of the thermostatically controlled valve and line 10 behind check valve 11. Line 12 is also provided with a check valve 13 which may be regulated to provide a steady flow of gas to the pump 9 representing the minimum requirement for operation thereof.

The nature and objects of the present invention having thus been described and illustrated, what we desire to claim as new and useful and secure by Letters Patent is:

In a system for treating an oil field emulsion including a treater, an emulsion inlet line connected to said treater, a chemical inlet line connected to said emulsion inlet line, a gas operated proportioning pump in said chemical line, a gas operated heater for said treater, a gas line for feeding said heater and a control valve in said line operated by a thermostat in said treater, a line for conducting gas from said gas heater line behind the thermostatically controlled valve thereof to said gas operated pump.

RUDOLPH C. BUCHAN.
PAUL L. McGEE.